May 30, 1961  G. S. KNOX  2,986,371
GATE TYPE VALVE
Filed Aug. 11, 1958  2 Sheets-Sheet 1
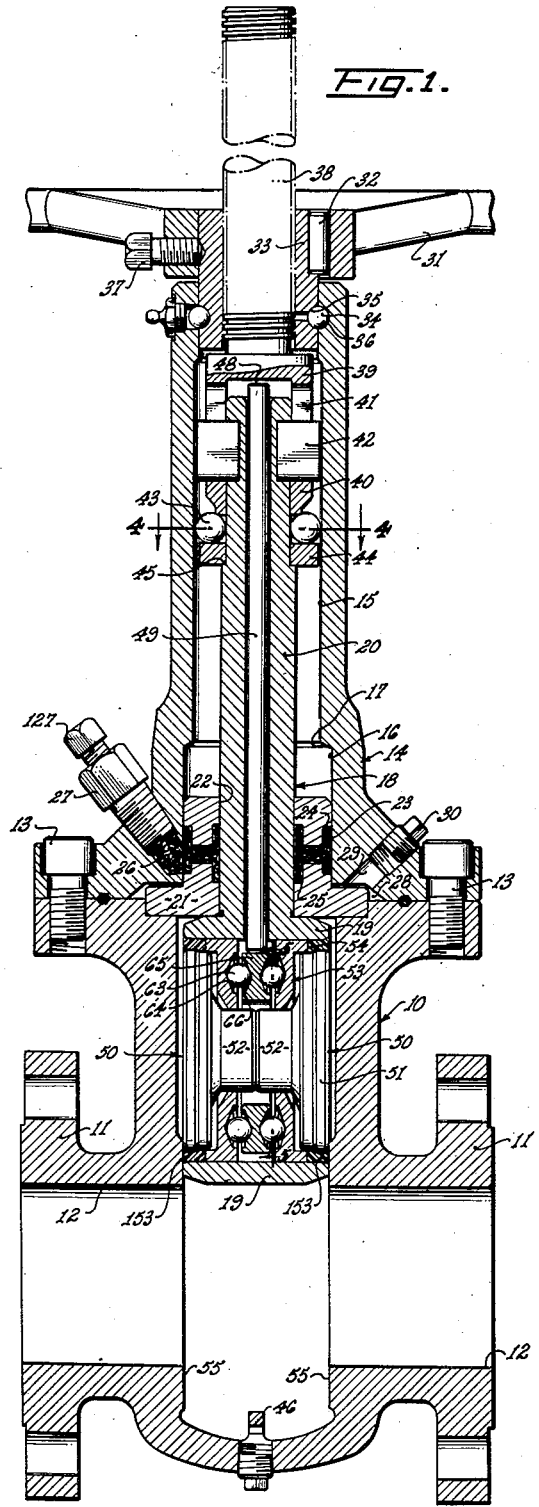
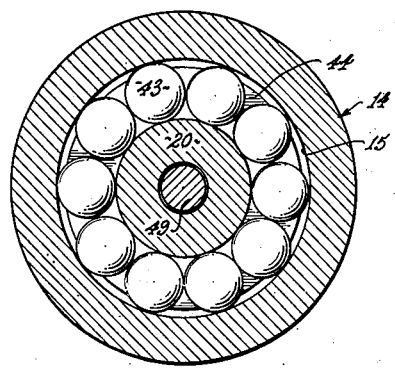
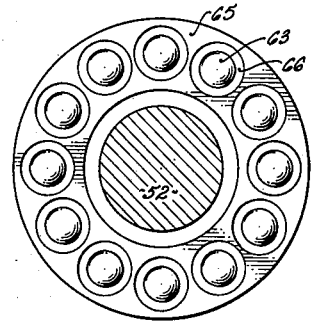
GRANVILLE S. KNOX
INVENTOR.
BY
ATTORNEYS May 30, 1961 G. S. KNOX 2,986,371
GATE TYPE VALVE
Filed Aug. 11, 1958 2 Sheets-Sheet 2

GRANVILLE S. KNOX
INVENTOR.

BY White & Haeflin
ATTORNEYS

United States Patent Office 2,986,371
Patented May 30, 1961

2,986,371
GATE TYPE VALVE

Granville S. Knox, Glendale, Calif., assignor to Hydril Company, Los Angeles, Calif., a corporation of Ohio Filed Aug. 11, 1958, Ser. No. 754,485
10 Claims. (Cl. 251—187)

This invention relates generally to improvements in gate type valves, and more particularly has to do with improvements in rubber or plastic sealed gate valves wherein the sealing function is automatically controlled so as to release the seal prior to stopper displacement from closed position and so as to effect sealing action only after the stopper has been moved to closed position, all for purposes to be described. The present invention represents an improvement over that disclosed in my copending U.S. application "Valve" Serial No. 601,771 and filed August 2, 1956, now U.S. Patent No. 2,863,629.

From the standpoint of simple and reliable operation of a gate valve incorporating packing material for sealing off between the movable gate stopper and the fixed valve body or chamber, it is found that for maximum effectiveness and uniformity of sealing pressure distribution the packing should be bodily displaceable into pressural sealing engagement with both the stopper assembly and portions of the valve chamber. Furthermore, the packing which should be formed of a relatively rigid internally tenacious material such as molded rubber or tetrafluoroethylene, must be closely confined by metal parts when relatively great flow pressure is exerted thereon in order to minimize any tendency of the material to extrude out between the adjacently relatively movable metal parts.

More importantly, the packing should be out of pressural engagement with certain portions of the valve chamber during movement of the gate into and out of open and closed positions, so that the packing will be effectively out of the path of relative movement as between the gate stopper and the valve chamber, and therefore not subject to unnecessary frictional erosion. Also, it is desirable that the sealing action be automatically initiated as the manual control for the gate stopper is moved to open or closed positions, or both, and with as little complication as possible as respects the number of interacting parts required to establish the seal.

Another important consideration concerns the ability of a valve to be closed while there is a high velocity flow of liquid or gas passing therethrough. Under such conditions, when the valve stopper is very nearly closed and the fluid flow therethrough is highly restricted, the pressure on one side of the valve is high and the pressure on the other side is low. This condition produces zones of high differential pressure within the body of the valve, the effect of which in valves employing rubber or plastic sealing elements, is to cause or tend to cause displacement or extrusion of the plastic sealing medium from a high pressure zone into a low pressure zone. The extent of extrusion, with given pressure differential and given time of exposure to that differential pressure, will of course depend upon such considerations as the flow characteristics of the plastic material, the location of the material and means provided for anchoring or retaining the plastic material within a rigid enclosure.

Any appreciable extrusion of the plastic sealing medium may cause the pressure sealing characteristics of the valve to become ineffectual for there is generally no way of restoring the extruded material to its original condition. The effect of even relatively slight extrusion of the plastic material may be damaging since continued movement of the stopper to the fully closed position would shear or scrape off some of the sealing material, and even though the initial loss might be slight, subsequent closures, resulting in loss of additional material, would eventually render the rubber or plastic sealing element ineffectual.

The situation is complicated by the fact that, in a given valve, a zone of relatively high pressure will become a zone of relatively low pressure when high velocity flow through the valve is in the opposite direction. Accordingly, to adapt a valve for universal application, the structure should preferably be so fashioned that harmful simultaneous exposure of the plastic material to differential pressure zones is prevented irrespective of the direction of fluid flow.

The foregoing discussion deals with the problems encountered when rubber or plastic sealed valves are closed against high velocity fluid flow. In general, the same or similar problems are encountered when rubber or plastic sealed valves are opened under conditions of high differential pressures.

It is therefore a major object of this invention to provide a gate valve of the plastic seal type, wherein the sealing elements are carried by the stopper and are released from pressural contact with the valve chamber so that they will not be subjected to wear or exposed to different pressure conditions at times when such exposure might subject them to damaging extrusion.

Furthermore, when a gate valve is closed under conditions of high differential pressures between the flow ports, the latter pressure tends to thrust the gate assembly hard against the chamber wall on the downstream side of the valve, and high longitudinal thrust must be exerted against the valve stem in order to overcome friction and move the gate to the fully closed position. These high thrust loads on the valve stem create serious problems in gate valves wherein the sealing action is automatically initiated after the gate assembly reaches its fully closed position, and where some form of latch or blocking means is employed to prevent the sealing action from taking place before the gate assembly reaches the fully closed position. This problem is made more acute by the fact that the latch must release at a time when the thrust load upon the stem is at a maximum. The latching mechanism, therefore, must be extremely durable and wear resistant if it is to have a satisfactory service life.

It is therefore another major object of this invention to provide a durable telescoping type of valve stem of novel design which permits the thrust loads to be carried upon a full circle of hardened steel balls operating between spaced annular shoulders of hardened steel. This is in contrast to a type of latching arrangement which will accommodate only a few load bearing latch elements because of the necessity of carrying them in spaced openings in a tubular valve stem member.

The present novel gate valve succeeds in carrying into practice all the desired features and advantages discussed above through the provision in a gate valve having a longitudinally elongated chamber and a stopper assembly movable longitudinally therein, of a pair of internally tenacious packing annuli carried in cavities formed in the stopper assembly, the packing annuli sealing off between the stopper assembly and laterally spaced chamber walls when the stopper assembly is in valve closed position with respect to lateral inlet and outlet passages communicating with the chamber, and means movable laterally oppositely to transmit pressure acting against the inner faces of the packings for thrusting their outer faces toward and into sealing engagement with the chamber walls when the stopper assembly is in closed position.

In particular, the said means includes a pair of laterally spaced thrust rings and two laterally offset series of circularly spaced bearing balls, these being carried by the stopper and movable laterally oppositely to transmit pressure for thrusting the packing annuli into engagement with the chamber walls. For this purpose, there is provided a control actuable to move the stopper assembly to closed position, and thereafter to move the bearing balls and thrust rings laterally oppositely to transmit the sealing pressure. The control includes a cam ring carried by and between the two series of bearing balls so as to be bodily displaceable longitudinally in response to longitudinal movement of a telescoping valve stem and push rod, tapering recesses in the cam ring and thrust rings receiving and seating the balls to cause them to move laterally oppositely as they roll frictionlessly on the tapering recess inner faces in response to longitudinal displacement of the cam ring. Thus, the structure provides for high pressure sealing engagement of the packing annuli with the valve body or chamber walls with minimum force application to the control, as for example the turning of a hand wheel as will be described.

During such pressurization the seals are completely confined in cavities formed by a stopper annular carrier, a pair of flanges within the carrier, and annular shoulders on the thrust rings projecting between the flanges and the carrier for thrusting the packings toward chamber walls bounding the inlet and outlet passages and blanking the cavities when the valve stopper assembly is in closed position, all as will appear.

The previously mentioned push rod for displacing the cam ring is received in a tubular stopper assembly stem, and is bodily displaceable by an actuator only after movement of the latter toward the push rod is unblocked by a series of balls fully disposed about the stopper stem. Such unblocking can occur only after the stopper assembly is in fully closed position, to prevent inadvertent actuation of the push rod with consequent pressurization of the packing annuli. Conversely, bodily displacement of the stopper assembly from closed to open position can occur only after the push rod has been disengaged from the actuator with consequent relief of pressurization of the packing annuli, a novel mechanism including the actuator balls being provided to accomplish these purposes.

These and other objects and advantages of the invention, as well as the details of an illustrative embodiment, will be more fully understood from the following detailed description of the drawings, in which:

Fig. 1 is a vertical section taken through the complete valve showing the stopper assembly in open position;

Fig. 4 is an enlarged section taken on line 4—4 of Fig. 1;

Fig. 5 is an enlarged section taken on line 5—5 of Fig. 1; and

Figure 2:
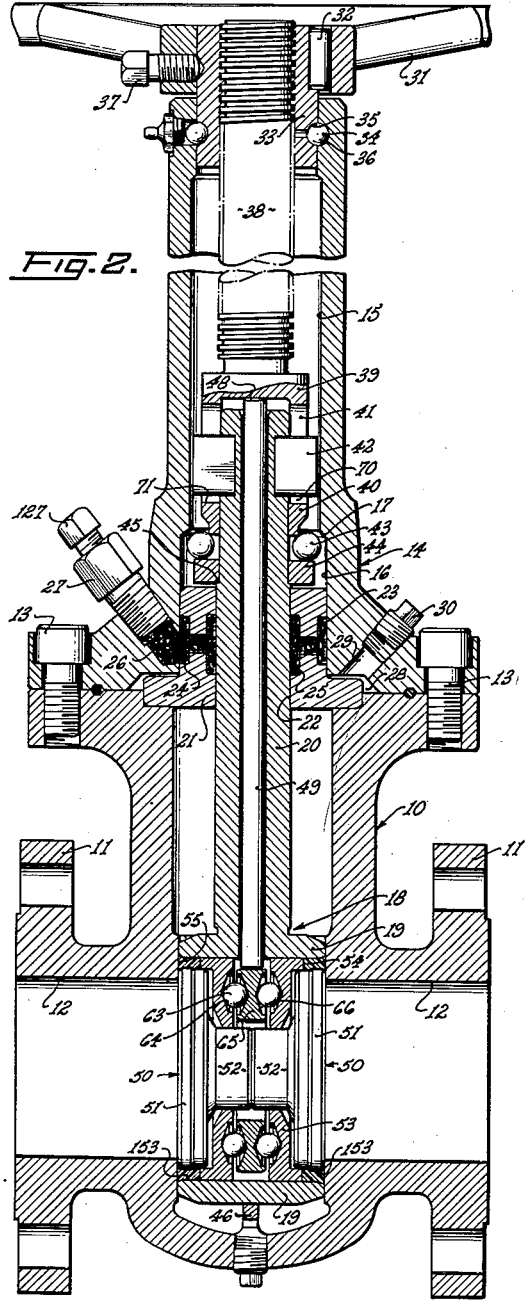
Fig. 2 is a view similar to Fig. 1 showing the stopper assembly in closed position.

Turning first to Fig. 1 in which the valve stopper is shown in fully open position, the longitudinally upright valve body or chamber 10 is shown as having a pair of laterally spaced flanges 11 containing laterally spaced inlet and outlet passages 12 for flowing fluid through the valve chamber. Mounted on the chamber 10 as by cap screws 13 is a tubular bonnet 14 having a bore 15 and a counterbore 16 separated by a cam shoulder 17. Received within the bonnet and the valve chamber is a stopper assembly generally indicated at 18, and which includes a ring-shaped carrier 19 in the valve chamber and a tubular stem 20 integral with the carrier and projecting upwardly within the bonnet. The stem is centered for longitudinal up and down displacement by a sleeve 21 retained by the valve chamber and bonnet, the stem 20 being slidable up and down in the bore 22 of the sleeve 21. Plastic packing 23 is injected into intercommunicating annular channels 24 and 25 sunk in the outer and inner surfaces of the sleeve 21, the injection opening or passage 26 in the bonnet being closed off by a threaded plug 27 which has a screw 127 rotatable to apply pressure to the injected packing for effecting a suitable sealing pressure of the packing against the stem 20. A passage 29 communicating with the interior of body chamber 10 through clearance spaces 28, is normally closed by another plug 30 which can be removed to test for possible leakage from passages 12 into the interior of body chamber 10 after the valve has been closed and sealed.

The stopper assembly stem 20 is movable up and down in the bore 15 in response to the rotation of a hand wheel 31 above the bonnet. The hand wheel hub 31 is keyed at 32 to a bearing sleeve 33, the lower portion of which is received in the tubular bonnet upper end, and is mounted to rotate therein by ball bearings 34, these being received in races 35 and 36 formed in the sleeve 33 and bonnet respectively. Removal of the hand wheel hub upwardly off the sleeve is resisted by a set screw 37 threaded into the hub and engaging a notch in the sleeve periphery.

The bearing sleeve in turn supports an actuator shaft 38 in threaded engagement with the sleeve through which it projects upwardly, the shaft 38 being integral with an actuator yoke 39 extending over the upper end of the tubular stem 20. An actuator sleeve 40 integral with the yoke fits down over the upper end portion of the tubular stem 20, the sleeve containing an opposite pair of vertically extending grooves 41 through which project an opposite pair of keys 42 carried by tubular stem 20. It is apparent that upon rotation of the hand wheel to lift the shaft 38, the actuator sleeve will move upwardly to engage the keys 42 and thereby lift the tubular stem 20 to raise the stopper assembly 18 to its completed open position as viewed in Fig. 1.

On the other hand, upon opposite rotation of the hand wheel 31 downward movement of the actuator sleeve 40 relative to the tubular stopper stem 20 is blocked by a series of balls 43 circularly arranged in closed together relation about the axis of the stopper stem and confined by the bonnet bore 15 between the lower extremity of the actuator sleeve 40 and the upper surface of a retainer ring 44 shouldered at 45 against the stopper stem 20. Thus, the balls and the ring 44 transmit downward thrust from the actuator sleeve 40 to stem 20 and stopper assembly 18 to displace the latter to fully closed position, as viewed in Fig. 2. Upon downward arrival of the stopper assembly 18 at fully closed position, the carrier ring 19 seats against a projection 46 in the lower interior of the chamber, preventing further downward displacement of the stopper assembly. At this time, the blocking balls 43 have arrived opposite the annular camming shoulder 17 as viewed in Fig. 2, so that further rotation of the hand wheel operates to displace the actuator sleeve 40 downwardly camming the balls outwardly into the counterbore 16, and thereby unblocking downward movement of the sleeve 40 relative to stem 20. As will appear, the actuator yoke 39 then comes into engagement with the upper end 48 of a push rod 49 extending longitudinally within the tubular stem, for bodily displacing the push rod downwardly.

Referring now to the structure contained within the annular carrier ring 19, as seen in Figs. 1, 2, 5 and 6 there is shown a pair of abutting cylinders 50 having end flanges 51 and extending coaxially with the axis of the carrier ring 19, the cylinders also including reduced diameter cylindrical portions 52. Each of these flanges forms with the carrier ring 19 an annular cavity 152 in which is received a packing annulus 153 preferably formed of molded tetrafluoroethylene, but it may be formed of other suitable internally tenacious materials. Mounted on the cylinders 50 are two thrust rings 53 which have annular shoulders 54 projecting laterally oppositely into the inner ends of the cavities 152 for pressurizing the packing annuli in laterally opposite and outward directions toward the chamber walls 55 bounding the passages 12, as better seen in Fig. 6. The carrier ring 19 and the cylinder flanges 51 are beveled at 56 and 57 respectively and after the packing material has once been pressurized into contact with these beveled surfaces it tends to remain slightly flared and thereby provides a tight wedging fit of the packing in annular cavities 152. An inwardly facing bevel 58 on the flange 51 has a retaining effect on the packing inwardly thereof, so that on an overall basis each packing effectively blocks leakage to the interior of carrier 19 and also tends to remain locked against withdrawal from the cavity 152 in the position shown in Fig. 6. On the other hand, such locking does not interfere with some bodily retraction of the packing away from the outer face of chamber wall 55 when the pressure between thrust ring shoulder 54 against the inner face 60 of the packing is relieved. Since the interior of ring 19 is in constant communication with the exterior of the valve through clearance between rod 49 and stem 20 and therefore contains only atmospheric pressure, it is apparent that any fluid pressure within valve chamber 10 or fluid passages 12 will tend to force the packing 153 inwardly into the cavities 52 when thrust against the inner face 60 of the packing is relieved. Thus each packing 153 is entirely confined against pressural extrusion from the cavity 152 by differential fluid pressures which may exist between the passages 12 or between them and the pressure in the valve chamber.

Outward thrusting of the rings 53 to pressurize the packing annuli 153 in response to downward longitudinal displacement of the push rod 49 is achieved by the control structure shown in Figs. 1, 2 and 5 and which will now be described. In particular, two laterally offset series of circularly closely spaced bearing balls 63 are received in correspondingly circularly spaced outwardly tapered recess 64 sunk in the inner faces of the thrust rings 53 so that the balls may roll with almost no friction against the tapered recess inner surfaces. The balls in turn mount a cam ring 65 which has inwardly tapering recesses 66 sunk in its opposite side faces, and also receives the balls, so that the latter may roll against these cam ring recess tapering surfaces. Thus, in effect the cam ring is mounted by the balls 63 to float relative to the thrust rings 53, and the recesses 64 and 66 and balls 63 are sized so as to remain relatively centered and thereby center the cam ring 65 with respect to the carrier ring 19 when the push rod 49 is not forced downwardly by the actuator yoke 39. In this regard, it should be noted that the packing annuli 153, and flanges 51 always remain at least partially confined between chamber walls 55 and therefore can not move outwardly enough to materially uncenter the balls and the cam ring.

Although fluid pressure within valve chamber 10 and passages 12 tend to force the packing annuli 153 inwardly, these forces are easily overcome when the push rod is positively and forcibly displaced downwardly to displace the cam ring 65 longitudinally and downwardly thereby frictionlessly rolling the balls on the tapered surfaces of the recesses 64 and 66, and as a result displacing the balls 63 laterally outwardly for thrusting the rings 53 outwardly against the inner faces 60 of the packing annuli to pressurally urge the packing outer faces 59 against the chamber walls 55. In moving outwardly as described, the thrust rings 53 ride against the reduced diameters 52 of cylinders 50 acting to guide the rings during such movement. Also, the cylinder flanges are centered between the thrust ring portions projecting into the cavities 52, so that the cylinder flanges accommodate themselves to movement of the thrust rings, preventing binding thereof.

When it is desired to open the valve, reverse rotation of the hand wheel 31 operates first of all to relieve the downward force exerted on the push rod 49 and thereby relieve the packing annuli. This occurs prior to upward bodily displacement of the stopper assembly since the actuator sleeve 40 is required to move upwardly relative to the stopper stem 20 to take up the clearance 70 between the guide shoulders 71 and the keys 42 before the latter are lifted for raising the stopper assembly. By this time the packing annuli are completely relieved of all outwardly directed thrust loads so that the packing annuli may be lifted with the packing assembly without eroding against the chamber walls.

Figure 3:
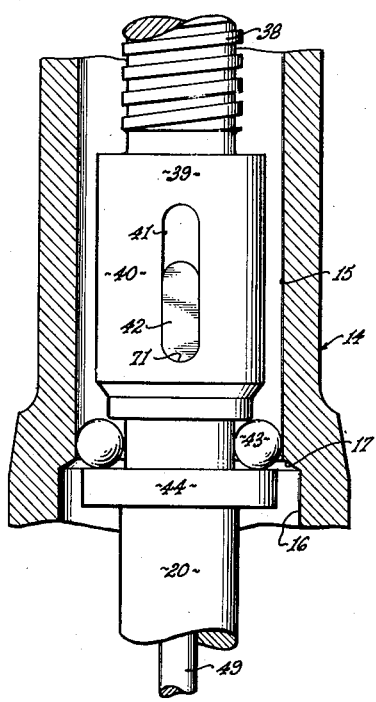
Fig. 3 is an enlarged fragmentary view partly in section showing the push rod actuator in blocked position.
Figure 6:
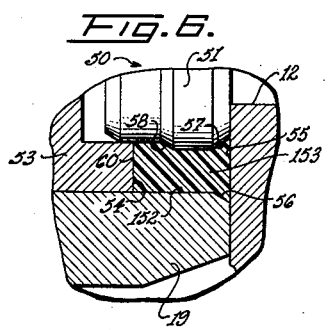
Fig. 6 is an enlarged fragmentary section showing the confinement of a packing annulus by the stopper assembly carrier, a cylindrical flange and a thrust ring, with the valve chamber wall blanking the packing cavity when stopper is in closed position.

As the ring 44 lifts the balls 43, the latter are cammed inwardly by the shoulder 17 and then under the actuator sleeve as illustrated in Fig. 3, to block downward displacement of the actuator sleeve relative to the stem 20, as previously described.

I claim:

1. In a gate valve, a longitudinally elongated chamber having laterally spaced inlet and outlet fluid flow passages and opposite inner faces surrounding said passages, a stopper assembly movable longitudinally of the chamber into and out of flow blanking closed position between said chamber faces, said assembly having faces opposing said chamber faces when the assembly is in said closed position, said stopper assembly including an outer carrier having a bore and a longitudinally elongated tubular stem, push rod means movable longitudinally within and relative to said stem, said assembly including a rigid core within said bore and having a cylindrical periphery offset radially inwardly of the bore wall, the axes of said bore and core extending laterally in the directions of the inlet and outlet flow passages when the assembly is in said closed position, said periphery and the carrier together forming an annular cavity, an internally tenacious packing annulus in said cavity adjacent at least one of the stopper assembly faces and sealing off between said core and carrier, means within the carrier for bodily thrusting said packing annulus into pressure sealing engagement with one of said chamber inner faces when the assembly is in said closed position, said last named means including a laterally movable rigid thrust member in said cavity for thrust transmitting engagement with said packing annulus, a cam ring adjacent said member and in longitudinal alignment with said push rod and bearing balls between said member and ring and spaced about the bore axis, said cam ring and thrust member forming laterally complementary recesses having inner ball camming surfaces engaging said balls, said cam ring being supported by said balls in spaced relationship radially inwardly of said carrier and radially outwardly of said core, and control means actuatable first to move said stopper assembly into said closed position within the chamber and then to displace said push rod longitudinally into engagement with the cam ring, said core extending laterally through the cam ring with sufficient clearance therefrom that the cam ring is freely displaceable longitudinally and eccentrically in said bore relative to said thrust member whereby relative longitudinal offsetting of said complementary ball camming surfaces causes the cam ring to thrust the balls laterally toward the thrust member for effecting said sealing engagement with said chamber face.

2. In a gate valve, a longitudinally elongated chamber having laterally spaced inlet and outlet fluid flow passages and opposite inner faces surrounding said passages, a stopper assembly movable longitudinally of the chamber into and out of flow blanking closed position between said chamber faces, said assembly having faces opposing said chamber faces when the assembly is in said closed position, said stopper assembly including an outer carrier having a bore and a longitudinally elongated tubular stem, push rod means movable longitudinally within and relative to said stem, said assembly including a rigid core within said bore and having at least one cylindrical flange offset radially inwardly of the bore wall, the axes of said bore and core extending laterally in the directions of the inlet and outlet flow passages when the assembly is in said closed position, said flange and the carrier together forming an annular cavity, an internally tenacious packing annulus in said cavity adjacent at least one of the stopper assembly faces and sealing off between said core and carrier, means within the carrier for bodily thrusting said packing annulus into pressure sealing engagement with one of said chamber inner faces when the stopper is in said closed position, said last named means including a laterally movable rigid thrust member in said cavity for thrust transmitting engagement with said packing annulus, a cam ring adjacent said member and in longitudinal alignment with said push rod and bearing balls between said member and ring and spaced about the bore axis, said cam ring and thrust member forming laterally complementary recesses having inner ball camming surfaces engaging said balls, said cam ring being supported by said balls in spaced relationship radially inwardly of said carrier and radially outwardly of said core and control means actuatable first to move said stopper assembly into closed position within the chamber and then to displace said push rod longitudinally into engagement with the cam ring, said core extending laterally through the cam ring with sufficient clearance therefrom that the cam ring is freely displaceable longitudinally and eccentrically in said bore relative to said thrust member whereby relative longitudinal offsetting of said complementary ball camming surfaces causes the cam ring to thrust the balls laterally toward the thrust member for effecting said sealing engagement with said chamber face, said control including an actuator movable relative to the stopper assembly to engage and bodily move said push rod means after the stopper assembly is in said closed position and a plurality of blocking balls locking said actuator relative movement during longitudinal travel of said stopper assembly in said chamber.

3. In a gate valve, a longitudinally elongated chamber having laterally spaced inlet and outlet fluid flow passages and opposite inner faces surrounding said passages, a stopper assembly movable longitudinally of the chamber into and out of flow blanking closed position between said chamber faces, said assembly having faces opposing said chamber faces when the assembly is in said closed position, said assembly including an outer ring-shaped carrier having a bore and a longitudinally elongated tubular stem, push rod means movable longitudinally within and relative to said stem, said assembly including a rigid spool-shaped core within said bore and having a pair of laterally spaced cylindrical flanges offset inwardly of the bore wall, the axes of said bore and core extending laterally in the directions of the inlet and outlet flow passages when the assembly is in said closed position, the lateral extents of said spool and carrier being substantially equal, said flanges and the carrier together forming a pair of annular cavities blanked by said chamber faces when the stopper assembly is in closed position, a pair of internally tenacious packing annuli in the respective cavities adjacent the stopper assembly faces and sealing off between said flanges and the carrier bore, means between said flanges and within the carrier for bodily thrusting said packing annuli laterally oppositely into pressure sealing engagement with the chamber inner faces, said last named means including a pair of laterally spaced thrust rings supported on said core for coaxial lateral movement projecting into said cavities for thrust transmitting engagement with said packing annuli, a cam ring intermediate said thrust rings and two series of bearing balls respectively between said thrust rings and cam ring and spaced about the bore axis, said cam ring and thrust rings forming laterally complementary recesses having inner ball camming surfaces engaging said balls, said cam ring being supported by said balls in spaced relationship radially inwardly of said carrier and radially outwardly of said core, and control means actuatable first to displace said stopper assembly into closed and predetermined fixed position within the chamber and then to displace said push rod longitudinally into engagement with the cam ring, said core extending laterally through the cam ring with sufficient clearance therefrom that the cam ring is freely displaceable by the push rod longitudinally and eccentrically in said carrier bore relative to said thrust rings whereby relative longitudinal offsetting of said complementary ball camming surfaces causes the cam ring to thrust the balls laterally toward the thrust rings for effecting said sealing engagement.

4. The invention as defined in claim 3 in which said complementary recesses are conical and intersect the sides of the cam and thrust rings at circular loci the diameters of which are substantially greater than the ball diameters, whereby the balls remain exclusively in rolling engagement with the cam and thrust rings during longitudinal bodily displacement of the cam ring by the push rod.

5. The invention as defined in claim 3 in which said control includes an actuator movable relative to said stopper stem to engage and bodily move the push rod after the stopper assembly is in said closed position, and a plurality of other balls disposed about the stopper stem blocking said actuator relative movement during longitudinal travel of said stopper assembly in said chamber.

6. The invention as defined in claim 5 including a longitudinally extending tubular valve bonnet receiving said stem and actuator and confining said blocking balls at the lower end of said actuator during said stopper assembly longitudinal travel in said chamber.

7. The invention as defined in claim 6 in which the bonnet contains a bore enlargement radially outwardly of the blocking balls when the stopper is in said closed position, said blocking balls then being bodily outwardly movable into said enlargement in response to longitudinal movement of the actuator into engagement with the push rod.

8. The invention as defined in claim 3 in which said packing annuli exert force acting through said thrust rings and bearing balls to hold said cam ring substantially centered with respect to the lateral axis of said carrier.

9. In a valve including a chamber having laterally spaced inlet and outlet fluid flow passages, a stopper assembly movable longitudinally of the chamber into and out of flow blanking closed position between said passages, said assembly including a longitudinally extending tubular stem within a chamber extension, a pusher in the stem, and means carried by at least one of the stopper assembly and chamber and operable in response to longitudinal displacement of the pusher relative to the stopper assembly to seal off between the stopper assembly and chamber about at least one of said passages when the stopper is in said closed position, the improvement which comprises control means actuatable to displace longitudinally and stopper assembly to closed position and then to displace longitudinally said pusher, said control means including a circular series of balls confined about the stopper stem periphery and within the chamber extension and through which force is transmissible for displacing the stopper assembly longitudinally to closed position, an actuator longitudinally movable relative to and toward the pusher, said actuator being operable to transmit said force to the balls and thereafter to effect said longitudinal displacement of the pusher in response to movement of the actuator relative to the stopper assembly, said balls being in the path of actuator relative movement and acting to block said relative movement of the actuator during stopper assembly movement to closed position, and said balls being movable laterally away from the stopper stem and out of said path in response to said actuator relative movement thereby unblocking said actuator relative movement, when the stopper assembly is in said closed position, and chamber extension having a longitudinally extending bore wall restraining outward lateral movement of said balls away from said stem when the stopper is out of closed position and said bore wall terminating in a bore enlargement allowing outward lateral displacement of the balls away from said stem when the stopper is in closed position.

10. The invention as defined in claim 9 in which said control means includes longitudinally spaced annular shoulders on the actuator and the stopper stem, said shoulders extending about the stopper stem with the balls therebetween and engageable thereby, at least one of said shoulders being relatively longitudinally movable toward the other in response to said actuator relative movement for moving said balls away from the stopper stem.

References Cited in the file of this patent
UNITED STATES PATENTS

| | | |
|---|---|---|
| 2,229,871 | Penick | Jan. 28, 1941 |
| 2,734,714 | Knox | Feb. 14, 1956 |
| 2,854,209 | Erwin | Sept. 30, 1958 |
| 2,863,629 | Knox | Dec. 9, 1958 |
| 2,865,597 | Lucas | Dec. 23, 1958 |
| 2,876,986 | Knox | Mar. 10, 1959 |

UNITED STATES PATENT OFFICE

CERTIFICATE OF CORRECTION

Patent No. 2,986,371                         May 30, 1961

Granville S. Knox

It is hereby certified that error appears in the above numbered patent requiring correction and that the said Letters Patent should read as corrected below.

Column 7, line 2, for "rid" read -- rod --; line 41, for "locking" read -- blocking --; column 8, line 64, for "and", first occurrence, read -- the --; column 9, line 7, for "and" read -- said --.

Signed and sealed this 14th day of November 1961.

(SEAL)
Attest:

ERNEST W. SWIDER
Attesting Officer

DAVID L. LADD
Commissioner of Patents

USCOMM-DC